United States Patent [19]

Hassler, Jr.

[11] Patent Number: 5,791,531

[45] Date of Patent: Aug. 11, 1998

[54] HIGH SPEED FLUID DISPENSER HAVING ELECTROMECHANICAL VALVE

[75] Inventor: William T. Hassler, Jr., Elyria, Ohio

[73] Assignee: Nordson Corporation, Westlake, Ohio

[21] Appl. No.: 630,677

[22] Filed: Apr. 12, 1996

[51] Int. Cl.[6] ................................................. B67D 3/00
[52] U.S. Cl. ................ 222/504; 251/129.16; 251/129.17
[58] Field of Search ............................ 222/146.5, 504, 222/512, 518, 559; 251/129.15, 129.16, 129.17

[56] References Cited

U.S. PATENT DOCUMENTS

| | | |
|---|---|---|
| 2,114,961 | 4/1938 | Gille . |
| 2,491,905 | 12/1949 | Ray . |
| 2,860,850 | 11/1958 | Rhodes et al. . |
| 3,144,047 | 8/1964 | Tjaden . |
| 3,250,293 | 5/1966 | Adams et al. . |
| 3,383,084 | 5/1968 | Mayfield . |
| 3,422,850 | 1/1969 | Caldwell . |
| 3,521,854 | 7/1970 | Leiber et al. . |
| 3,670,274 | 6/1972 | Ellison . |
| 3,702,683 | 11/1972 | Sturmer . |
| 3,811,601 | 5/1974 | Reighard et al. ............... 222/504 |
| 3,833,015 | 9/1974 | Kneuer . |
| 3,877,488 | 4/1975 | Baturay et al. . |
| 3,921,670 | 11/1975 | Clippard et al. . |
| 3,965,377 | 6/1976 | Carbonneau . |
| 4,066,188 | 1/1978 | Scholl et al. ................... 222/504 |
| 4,474,332 | 10/1984 | Kaska ........................... 239/585.3 |
| 4,477,027 | 10/1984 | Knapp et al. ................ 239/585.3 |
| 4,488,665 | 12/1984 | Cooks et al. . |
| 4,722,364 | 2/1988 | Kubach et al. . |
| 4,951,917 | 8/1990 | Faulkner . |
| 5,005,803 | 4/1991 | Fritz et al. ........................ 251/129.1 |
| 5,033,371 | 7/1991 | Mesenich ....................... 251/129.1 |
| 5,054,691 | 10/1991 | Huang et al. ................... 251/129.16 |
| 5,054,742 | 10/1991 | Nicolaisen . |
| 5,139,224 | 8/1992 | Bright ........................... 251/129.15 |
| 5,178,332 | 1/1993 | Tsukakoshi et al. . |
| 5,192,936 | 3/1993 | Neff et al. . |
| 5,375,738 | 12/1994 | Walsh et al. . |
| 5,381,966 | 1/1995 | Gernert ......................... 251/129.16 |
| 5,414,398 | 5/1995 | Schumacher ............... 251/129.15 |
| 5,470,045 | 11/1995 | Kazama et al. ............. 251/129.17 |
| 5,476,079 | 12/1995 | Kanamori et al. .......... 251/129.16 |

FOREIGN PATENT DOCUMENTS

| | | |
|---|---|---|
| 349117 | 3/1979 | Austria . |
| 0054108 | 6/1982 | European Pat. Off. . |
| 0063952 | 11/1982 | European Pat. Off. . |
| 60-014678 | 1/1985 | Japan . |
| 2058467 | 4/1981 | United Kingdom . |
| 8200604 | 3/1982 | WIPO . |

*Primary Examiner*—Philippe Derakshani
*Attorney, Agent, or Firm*—Rankin, Hill, Lewis & Clark

[57] ABSTRACT

A fluid dispenser for dispensing various types of viscous fluids has a valve which is capable of operating at high speeds. The valve has a stiff diaphragm spring which moves an armature which has a relatively large pole face area directly opposite the end faces of an inner and outer core. So that movement of the armature is not interfered with by the fluid material above or below the armature, openings are provided through the armature for the flow of the fluid material. The armature is positioned close to the cores, and is provided with a short stroke, so that the air gaps in the flux loop between the armature and the cores are small, reducing the reluctance of the magnetic circuit and thus increasing the amount of force produced by the coil.

36 Claims, 3 Drawing Sheets

HIGH SPEED FLUID DISPENSER HAVING ELECTROMECHANICAL VALVE

BACKGROUND OF THE INVENTION

1. Field of the Invention

This invention relates to a fluid dispenser or applicator, particularly one incorporating an electromechanically actuated valving mechanism capable of operating at high frequencies.

2. Description of the Prior Art

In the dispensing of various types of viscous fluids, such as liquid adhesives, sealants, caulks, and other less viscous materials and in the application of such materials in manufacturing production lines, it is necessary to start and to stop the flow of the fluid periodically. The interruption of the flow is usually accomplished by means of an electrically operated valve, such as a solenoid valve, provided in the dispensing head. Such valves operate by means of a plunger driven open by an electromagnetic field and closed by a spring biasing means. An example of a dispenser incorporating such a valving mechanism is shown in U.S. Pat. No. 5,375,738. In the past, various types of valves have been used. Generally, these valves have relied upon a plunger movable within a core having an electromagnetic coil. The operating cycle of such valves has been relatively slow which has limited the techniques by which the material could be applied by the dispenser.

An electromagnetic valve which should be able to operate at somewhat higher frequencies is disclosed in U.S. Pat. No. 3,921,670 which relates to an electrically operated valve for use in pneumatic control circuits. This valve has a magnetically responsive armature that opens and closes a port. It is believed that while this valve is capable of operating at higher frequencies, it can only operate at about 10 Hz, that is, the valve can only open and close about 10 times per second.

A dispenser with a valve which could operate at much higher frequencies would permit fluid material to be dispensed more precisely and in accurate patterns. It would also allow the fluid material to be dispensed more rapidly, resulting in more efficient manufacturing operation which could operate at higher speeds. However, the actuation of such a valve at sufficiently high frequencies has not been previously possible.

SUMMARY OF THE INVENTION

The present invention provides a novel design for a fluid dispenser for dispensing various types of fluids having a valve which is capable of operating at much higher frequencies than the dispensers of the prior art. The dispenser of this invention can operate at frequencies of up to 1,500 Hz, that is, it can open and close around 1,500 times per second. This allows the flow of viscous fluids dispensed by the dispenser to be started and stopped at high speeds, allowing precise application of the fluids and even permitting fluids to be dispensed in a printed pattern. It also allows the volume output of the dispenser to be reduced by pulsing the dispenser, and it allows the volume output to be regulated by modulating the pulse duration at a fixed frequency.

In accordance with the present invention, a high frequency dispenser is achieved by providing a dispenser with a valve having a stiff diaphragm spring, which spring is stiffer than the springs used in prior art high speed dispensers. In addition, the valve is actuated by an armature which has a relatively large pole face area overlying the end faces of the inner and outer cores of the core assembly. So that movement of the armature is minimally interfered with by the fluid material surrounding the armature, openings are provided through the armature for the flow of the fluid material. The openings provide a fast escape route for fluid material which would otherwise be trapped on the other side of the armature as the armature moves between the open and closed positions.

Thus, the present invention provides a dispenser with a valve which operates at higher frequencies through the provision of an armature operated by a very stiff spring and provided with holes for the escape of fluid material around the armature. The large spring force requires that a strong magnetic force be present to move the armature in opposition to the stiff spring. The strong magnetic force is achieved in part by providing an armature which presents a relatively large pole face area overlying the end face of the cores, as compared to the relatively small pole face area of U.S. Pat. No. 3,921,670, for example.

Moreover, the armature and cores are arranged with a small stroke, so that the air gaps in the flux loop between the armature and the cores are small. By maintaining small air gaps, the reluctance of the magnetic circuit produced by these air gaps is minimized, so that the amount of force produced by the coil is increased. The result is a stronger magnetic force which can oppose a stiff spring to produce very high frequency operation.

The dispenser of the present invention is capable of operating with a wide variety of fluids, including viscous fluids, such as liquid adhesives, sealants, caulks, and less viscous fluids having a viscosity approaching that of water. The dispenser is also capable of dispensing fluids which must be maintained at high temperatures, such as hot melt adhesives which must be maintained at temperatures in excess of 400° F.

Unlike many dispensers of the prior art, the valve mechanism in the dispenser of the present invention includes cores and a coil which are "wet," that is, the flow of fluid material being dispensed flows through the cores, and the cores and the coil are not sealed from this flow. This allows the cores and the coil, as well as the armature, to be located closer to the flow of fluid, so that a relatively short stroke of the armature can be used to open and close the valve. By operating with a short stroke, the valve can be opened and closed much more quickly than valves in dispensers of the prior art.

Also, unlike many dispensers of the prior art, the electromagnetic coil used in the valve of this dispenser has fewer turns. This allows the coil resistance to be much less than that in corresponding coils of prior art valving dispensers, so that this dispenser can operate on a low voltage circuit rather than a standard voltage circuit. This allows the use of less expensive and more reliable electronics in the control circuit operating the dispenser, and results in energy savings.

These and other advantages are provided by the present invention of a dispenser assembly having a magnetically operated valve for dispensing a fluid, which comprises a body having an inner chamber and having a passageway to introduce the fluid into the chamber. An inner core within the chamber has an inner passageway through which the fluid flows. An outer core is around the inner core. A valve member is positioned within the chamber and movable between an open position in which fluid flows out of the chamber and a closed position in which fluid flow from the chamber is blocked. An armature within the chamber is connected to move the valve member to the closed position.

The armature has a plurality of openings extending therethrough to permit at least some of the fluid on one side of the armature to move through the armature to the other side of the armature as the armature moves within the chamber. A diaphragm spring is mounted within the chamber and engages the armature to bias the valve member to the closed position. A magnetic coil is between the inner core and the outer core within the chamber and capable of energization to move the armature and allow the valve member to move to the open position.

DETAILED DESCRIPTION OF THE PREFERRED EMBODIMENT

Figure 1:
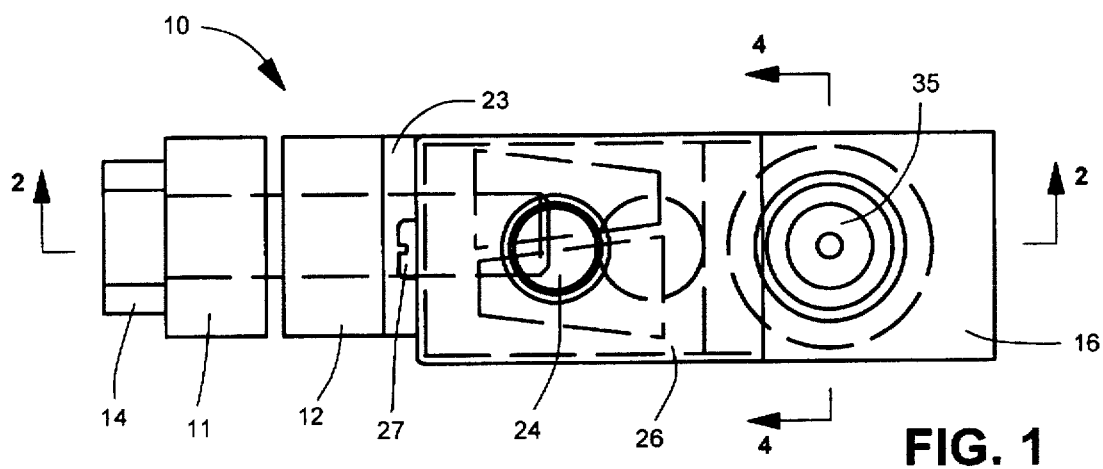
FIG. 1 is a top plan view of the applicator of the present invention.
Figure 2:
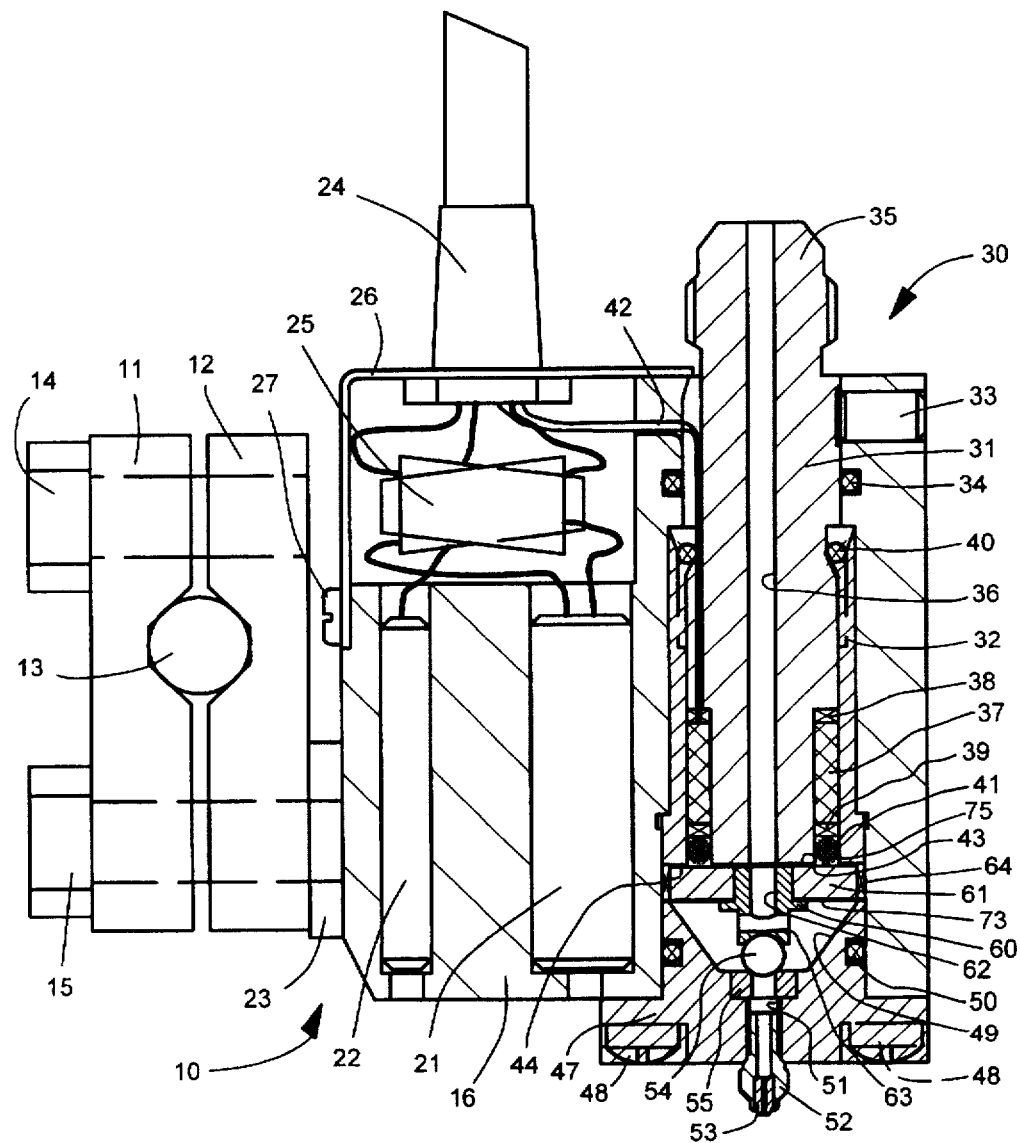
FIG. 2 is a side sectional view taken along line 2—2 of FIG. 1.

Referring more particularly to the drawings and initially to FIG. 2, there is shown an applicator 10 according to the present invention. The applicator 10 includes a retainer assembly comprising a first retainer 11 and a second retainer 12 together forming a clamp having an opening for insertion of a rod 13 upon which the applicator 10 may be mounted. The retainers 11 and 12 are clamped together around the rod 13 by a hex screw 14. An applicator body 16 is attached to the retainers 11 and 12 by a hex screw 15.

The applicator 10 depicted in this embodiment can be used for dispensing heated materials such as hot melt adhesive materials, so the applicator preferably includes a heater cartridge 21 within the body 16. A thermal insulator 23 is provided between the body 16 and the retainer 12 to insulate the mounting rod thermally from the heated block. A temperature sensor 22 is also provided in the body 16 for sensing the level of heat provided by the heater cartridge 21 so that the heater can be regulated. The power supply for the heater cartridge 21 and the connections for the temperature sensor 22 enter the body 16 through a cord set 24 extending from the body and connected to wire connectors 25 contained within a chamber in the body. The chamber in the body 16 containing the wire connectors 25 is enclosed by a removable electrical cover 26 which is attached to the body by a screw 27. Heat from the heater cartridge 21 is thermally transferred through the body 16 into an electromagnetic valve assembly 30 which is housed within the body. The heat is then transferred from the valve assembly 30 into the material being dispensed by the valve.

For unheated materials a smaller body (corresponding to the body 16) can be used to reduce the size of the applicator. Alternatively, smaller sized applicators can be used with heaters located upstream along the fluid path from the applicator, with the heaters not being formed as part of, or directly connected to, the applicator.

The valve assembly 30 includes a magnetic core comprising an inner core 31 and an outer core 32 is mounted in the body 16. The generally cylindrical inner core 31 is mounted within a corresponding cylindrical bore in the body 16 and is secured to the body by a set screw 33. An O-ring 34 is provided between the inner core 31 and the body 16 to provide a sealing engagement. A fitting 35 is formed on the top of the inner core 31 for connection to a supply hose for the fluid being dispensed. The fitting 35 is connected to a central axial passageway 36 which extends through the inner core 31. A coil 37 is wound around the inner core 31 with annular spacers 38 and 39 on each end of the coil. The outer core 32 surrounds the inner core 31 and the coil 37. An O-ring 40 is provided between the upper end of the outer core 32, and another larger O-ring 41 is provided between the lower ends of the outer core 32 and the inner core 31. A pair of leads 42 extends from the one end of the coil 37 and form a part of the cord set 24. The bottom of the cores 31 and 32 have end faces 43 and 44, respectively, which lie in the same horizontal plane as shown in FIG. 2.

For applications in which the fluid is not heated, the O-ring 41 can be eliminated. The O-ring 41 is needed in heated applications because the heat can crack the potting compound of the coil 37, and without the O-ring 41 fluid can leak past the coil and out of the applicator since the potting material of the coil also acts as a fluid seal. In non-heated applications, therefore, with the O-ring 41 eliminated, along with the spacers 38 and 39, the coil 37 is more truly "wetted" by the fluid material.

The term "wetted" as applied to the coil herein is used to mean a coil which is not enclosed in a sealed or isolated chamber to prevent it from coming into contact with the liquid. U.S. Pat. No. 5,375,738, for example, shows a non-wetted coil. Non-wetted coils are more remotely located from the armature which makes them less efficient. U.S. Pat. No. 3,921,670 shows a coil located relatively close to the armature but the valve in that patent is for controlling air flow, not liquid flow. By using a wetted coil in the present invention, the coil can be positioned close to the armature which improves the efficiency of the magnetic circuit, and reduces power requirements while permitting a strong magnetic force to be applied to the armature.

A nozzle retainer 47 is attached to the lower end of the body 16 by four screws 48. An O-ring 50 is provided between the body 16 and the retainer 47 to provide a sealed engagement between them. The connection of the retainer 47 to the body 16 forms an inner conical chamber 49 within the body below the cores 31 and 32. A dispensing channel 51 extends from the bottom of the chamber 49, and a nozzle holder 52 is inserted into the channel. A suitable nozzle 53 is inserted into the nozzle holder 52. Within the chamber 49 is a spherical valve member 54 which is capable of engaging an annular valve seat 55 mounted in the retainer 47 at the bottom of the chamber 49 to seal off the dispensing channel 51. The valve member 54 and the valve seat 55 are preferably made of a hard durable material such as carbide. The hard material permits the valve to undergo multiple cycles with a minimal amount of wear to the valve member 54 and the valve seat 55.

Figure 3:
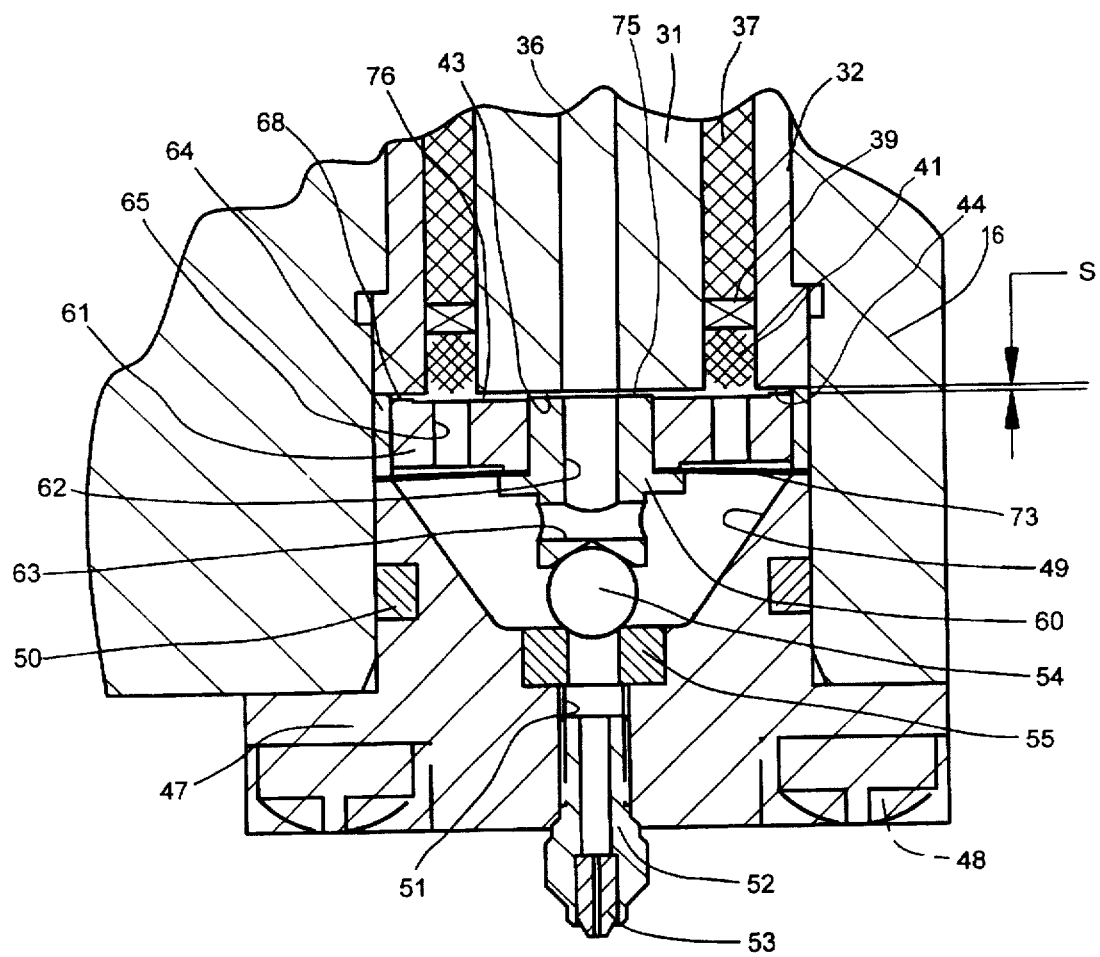
FIG. 3 is a detailed view of a portion of FIG. 2 to a larger scale showing the valving mechanism in the closed position.

The valve member 54 is connected to a two-piece armature which comprises an inner armature 60 which is press-fit into the center of an outer armature 61. A diaphragm spring 73 is sandwiched between the inner armature 60 and the outer armature 61, as shown in FIG. 3. The spring 73 is preferably keyed against rotation relative to the body 16 such as by forming a tab (not shown) on the outside periphery of the spring which projects into a slot (not shown) formed in the body 16. The spring 73 can also include a second tab (not shown) on its inside diameter to project into a slot (not shown) formed in the inner armature 60. This keying of the spring 73 prevents the spherical valve member 54 from rotating with respect to the valve seat 55 so that the valve member 54 wears evenly with respect to the seat 55.

Figure 5:
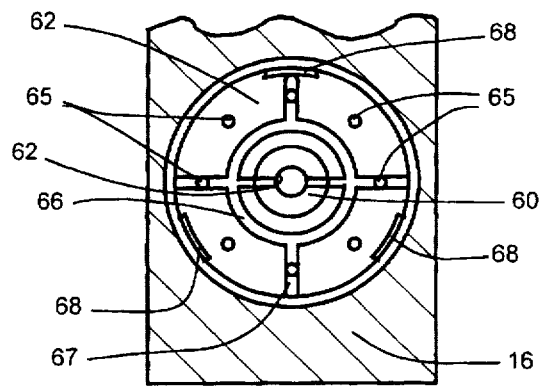
FIG. 5 is a top sectional view taken along line 5—5 of FIG. 4 showing the groove network on the armature.

The inner armature 60 has a central axial passageway 62 which communicates with radial passageways 63 to allow material to enter the conical nozzle chamber 49. An annular spacer ring 64 is located between the outer armature 61 and the inside wall of the body 16. The size of the spacer ring 64 in the axial direction controls the stroke of the armature 60, 61. As shown in FIGS. 3 and 5, the outer armature 61 has a plurality of holes 65 extending through the outer armature in a direction parallel to the axis of the armature. A network of grooves 66 and 67 is provided on the top of the inner armature 60 and the outer armature 61, as shown particularly in FIG. 5. The grooves preferably include a circular groove 66 and at least two radially extending grooves 67 which connect the circular groove with some of the holes 65. The radial grooves 67 help to channel fluid between the armature 60, 61 and the core 31, 32 toward the holes 65 in the outer armature 61 so that the fluid can be pushed out from between the armature 60, 61 and the core 31, 32 when the armature is pulled toward the core. The upper surface of the outer armature 61 also has three raised lands 68 extending along the edges of the armature. The lands 68 space the armature 60, 61 away slightly from the end surface of the core 31, 32 to prevent the armature from sticking to the core due to the presence of the fluid material between the armature and the core.

Figure 6:
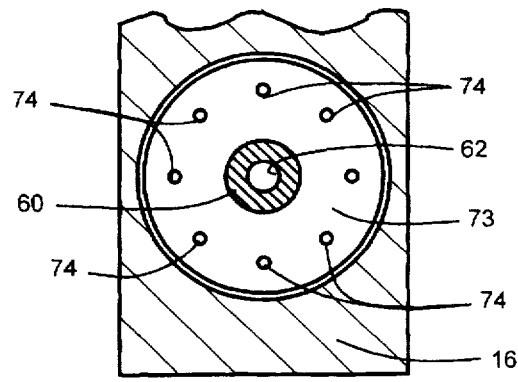
FIG. 6 is another top sectional view taken along line 6—6 of FIG. 4 showing the holes in the diaphragm spring.

The diaphragm spring 73 is used to bias the armature 60, 61 toward the dispensing end and thus bias the valve member 54 closed. The spring 73 is donut-shaped, and the inside diameter portion of the spring 73 is captured between the inner armature 60 and the outer armature 61, while the outer edge of the spring is captured between the spacer ring 64 and the retainer 47 as shown in FIG. 3. Referring to FIG. 6, the diaphragm spring 73 also has a plurality of holes 74, which align with the holes 65 in the outer armature 61. The previously described tab (not shown) which can be formed on the inside diameter of the spring 73 to lock the spring against rotation with the inner armature 60 can also be used to maintain alignment between the holes of the spring and the holes of the inner armature.

Figure 4:
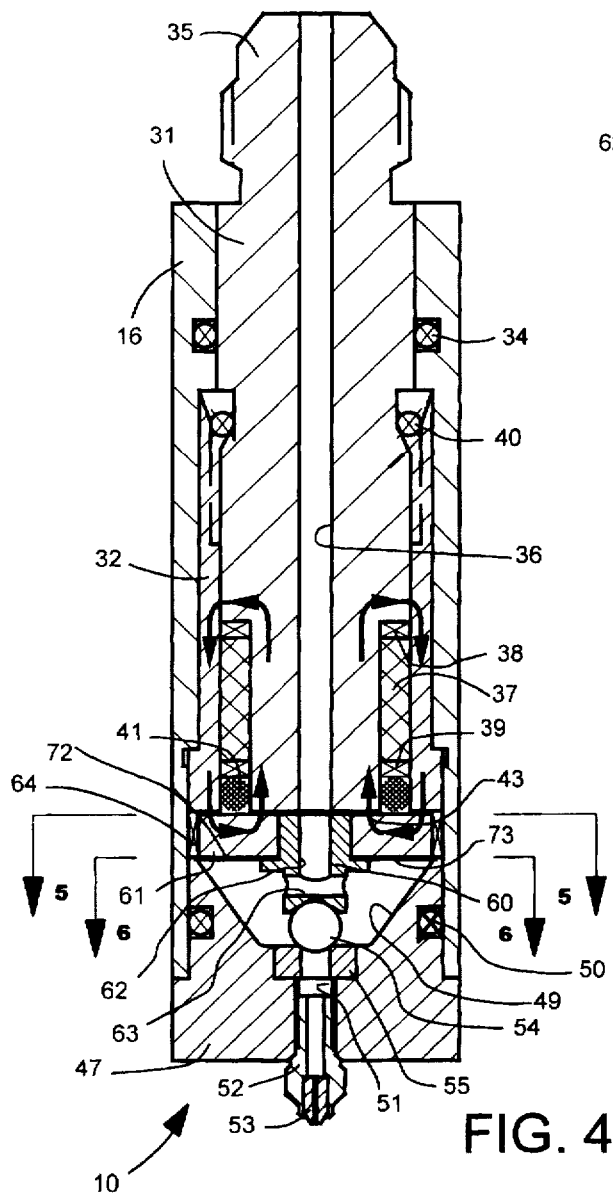
FIG. 4 is an end sectional view taken along line 4—4 of FIG. 1.

In operation, the valve is normally closed by action of the spring 73 urging the armature 60, 61 in a downward direction as shown in FIG. 3, so that the valve member 54 firmly engages the valve seat 55. When the coil 37 is energized, a magnetic field is established around the coil and a flux loop is created as shown in FIG. 4. The flux loop extends from the outer core 32 through the outer part of the outer armature 61, through the inner part of the outer armature 61 and the inner armature 60, through the inner core 31 and back to the outer core 32. The armature 60, 61 has pole faces 75 and 76 formed on the upper surface of the inner armature 60 and the outer armature 61, respectively, as shown in FIG. 3, and these pole faces substantially cover the end faces 43 and 44 of the core 31, 32. The windings of the coil 37 along with the relatively large pole face area presented by the armature 60, 61 opposite the end face area 43, 44 of the core combine to produce a relatively large electromagnetic force to pull the armature toward the core 31, 32 and allow the valve member 54 to move away from the valve seat 55 and open the valve. The fluid material that is temporarily captured between the armature 60, 61 and the core 31, 32 is channeled by means of the groove network 66 and 67 into the holes 65 in the outer armature 61, so that it flows into the chamber 49 as the armature 60, 61 moves upwardly. When the coil 37 is again de-energized, the diaphragm spring 73 pushes the armature 60, 61 in the opposite direction to close the valve. As the valve closes, the space between the armature 60, 61 and the core 31, 32 is quickly filled by the fluid which flows from the chamber 49 back through the holes 65 to the space between the armature 60, 61 and the core 31, 32.

As shown in FIG. 3, the stroke s through which the armature 60, 61 must move to open and close the valve is very small. The force created by the magnetic field produced by the coil 37 is a function of the number of turns of the coil and the current flowing through the coil. The air gap in the flux loop between the core 31, 32 and the armature 60, 61 increases the reluctance of the magnetic circuit and thus reduces the amount of force produced by the coil. By minimizing the stroke s of the armature 60, 61, the air gap created around the armature is minimized, and the opening force produced by the coil 37 is maximized.

The three lands 68 on the upper surface of the outer armature 61 maintain the outer armature in a stable fixed distance from the core 31, 32 as the armature is held against the core by the magnetic force. The lands 68 space the armature 60, 61 away slightly from the end surface of the core 31, 32 to prevent the fluid material from causing the armature to stick to the core. It is preferred that three lands 68 be provided, since two lands would result in an unstable positional relationship and four lands could also become unstable if the lands wear excessively and unevenly high.

The use of a diaphragm spring 73 is also a significant feature of this invention. The diaphragm spring 73 permits rapid actuation of the valve by quickly moving the armature 60, 61 to the closed position when the coil is de-energized. The valve closing force produced by the spring 73 and the opening force produced by the coil 37 and the armature 60, 61 are balanced to produce high speed operation of the valve. Preferably, the valve is designed to cycle through an opening and closing operation at rates of up to 1,500 times per second. In addition to balancing the opening and closing forces, the high speed operation is accomplished by providing a relatively small stroke s of the armature along with a large spring force and a large electromagnetic force.

In the present invention, the diaphragm spring 73 has a spring rate of at least 500 lb/in and preferably 1,000–1,500 lb/in. This compares to spring rates of 10–20 lb/in common in coil type springs used in prior art electromagnetic dispensers. In addition, the use of a diaphragm spring permits this high spring rate to be achieved with a very small mass compared to the mass of a coil spring, for example, having the same spring rate. This arrangement permits the armature 60, 61 to be spring biased to the closed position by a very strong spring force produced by a very small spring sandwiched between the armature elements 60 and 61. This feature, together with the close space of the armature to the coil, the short stroke of the coil, and the highly efficient and powerful magnetic circuit of this electromagnetic valve, permits the dispenser of the present invention to dispense dots of material at 1,500 Hz (i.e., 1,500 dots per second), well in excess of the operating frequency of prior art dispensers. Since the dispenser is capable of operating at high frequency, it is possible to use the open time of the valve to regulate the volume output of the dispenser. The valve can be pulsed to open at a desired frequency for a selected open time to produce a desired effective flow rate from the dispenser. This flow rate can then be changed by changing the valve frequency and/or open time of the valve.

Unlike the valving arrangements in many of the dispensers of the prior art, the valve assembly in the dispenser of this invention includes a core and coil which are "wet," that is the core 31, 32 and the coil 37 are within the material flow path and are immersed in the fluid material. This allows the armature 60, 61 to be closer to the core 31, 32 since the armature is also in the flow path. However, since the armature 60, 61 must move through the fluid material, the presence of the holes 65, as well as the channeling grooves 66 and 67, is important to allow the material to flow freely from one side of the armature 60, 61 to the other as the valve is opened and closed to permit rapid actuation of the valve.

The coil 37 has relatively few turns, for example, 150–250 turns, in contrast to prior art dispensers which may have electromagnetic coils with 1,000 turns or more. By reducing the number of turns on the coil, the electrical resistance of the coil is reduced. A coil for a dispenser in accordance with this invention may have a resistance of around 1–3 ohms, for example. By reducing coil resistance, the valve can operate using a low voltage control circuit of, for example, 48 volts, rather than a control circuit operating with a standard voltage of 150 volts. This allows the use of low voltage electronics which are less expensive and more reliable, and can result in energy savings.

Other variations and modifications of the specific embodiments herein shown and described will be apparent to those skilled in the art, all within the intended spirit and scope of the invention. While the invention has been shown and described with respect to particular embodiments thereof, these are for the purpose of illustration rather than limitation. Accordingly, the patent is not to be limited in scope and effect to the specific embodiments herein shown and described nor in any other way that is inconsistent with the extent to which the progress in the art has been advanced by the invention.

What is claimed is:

1. A dispenser assembly having a magnetically operated valve for dispensing a fluid, which comprises:
   a body having a inner chamber and having a passageway to introduce the fluid into the chamber;
   a inner core within the chamber having an inner passageway through which the fluid flows;
   an outer core around the inner core;
   a valve member positioned within the chamber and movable between an open position in which fluid flows out of the chamber and a closed position in which fluid flow from the chamber is blocked;
   an armature within the chamber connected to move the valve member to the open position, the armature having a plurality of openings extending therethrough to permit at least some of the fluid on one side of the armature to move through the armature to the other side of the armature as the armature moves within the chamber;
   a diaphragm spring mounted within the chamber and engaging the armature to bias the valve member to the closed position; and
   a magnetic coil between the inner core and the outer core within the chamber and capable of energization to move the armature and allow the valve member to move to the open position.

2. A dispenser assembly as defined in claim 1, wherein the spring has one or more openings which align with one or more of the openings of the armature.

3. A dispenser assembly as defined in claim 1, wherein the inner core and the outer core have end faces, and the armature is positioned adjacent to the end faces of the cores.

4. A dispenser assembly as defined in claim 3, wherein the armature presents a pole face which substantially covers the end faces of the cores.

5. A dispenser assembly as defined in claim 4, wherein the pole face covers the entire end faces of the cores except for the outer periphery thereof.

6. A dispenser assembly as defined in claim 4, wherein the armature pole face is comprised of pole faces of an inner armature and an outer armature, the pole faces being positioned opposite the end faces.

7. A dispenser assembly as defined in claim 1, wherein magnetic force produced by the coil and cores upon the armature is balanced with spring force produced by the diaphragm spring upon the armature to permit rapid actuation of the valve assembly.

8. The dispenser assembly as defined in claim 1, wherein the armature is comprised of an inner armature and an outer armature, and the spring is secured between them.

9. The dispenser assembly of claim 8, wherein the spring has an inner diameter which encircles an outside diameter of the inner armature.

10. The dispenser assembly as defined in claim 9, wherein the plurality of openings are formed in the outer armature and the spring has a plurality of openings which align with the openings in the outer armature.

11. A dispenser assembly as defined in claim 1, wherein the armature includes grooves on a surface of the armature adjacent to the cores to channel material to the holes.

12. A dispenser assembly as defined in claim 1, wherein the armature has lands which extend from a surface of the armature adjacent to the cores to position the armature relative to the cores.

13. A dispenser assembly as defined in claim 12, wherein the armature has three lands.

14. A dispenser assembly as defined in claim 13, wherein the armature is comprised of an inner armature and an outer armature, and the three lands are formed on the outer armature, the three lands extending from a surface of the outer armature adjacent to contact the outer core to position the armature relative to the cores.

15. A dispenser assembly as defined in claim 1, wherein the armature includes an inner armature which moves within the chamber to move the valve member and an outer armature around the inner armature which has the holes, the inner armature having a central flow passage for the fluid which communicates with the inner passageway of the inner core.

16. A dispenser assembly as defined in claim 1, wherein the diaphragm spring has a spring rate in excess of 500 lb/in..

17. A dispenser assembly as defined in claim 1, wherein the coil is a wetted coil.

18. A dispenser for dispensing a fluid, which comprises:
   a fitting for connection to a supply of the fluid;
   a nozzle for dispensing the fluid onto a substrate; and
   a valve assembly for controlling the flow of the fluid from the fitting to the nozzle, the valve assembly comprising
   a body having a inner chamber and having a passageway to introduce the fluid into the chamber,
   an inner core within the chamber having an inner passageway through which the fluid flows and having an inner end face,
   an outer core around the inner core, the outer core having an outer end face;
   a valve member positioned within the chamber and movable between an open position in which fluid flows out of the chamber and a closed position in which fluid flow from the chamber is blocked,
   an armature within the chamber connected to move the valve member to the open position, the armature being comprised of an inner armature having an inner pole face and an outer armature having an outer pole face, the outer armature having a plurality of openings extending therethrough and the inner armature having at least one opening extending therethrough to permit the fluid on one side of the armature to move to the other side of the armature as the armature moves within the chamber, a diaphragm spring mounted within the chamber and engaging the armature to bias the valve member to the closed position, and a magnetic coil between the inner core and the outer core within the chamber and capable of energization to move the armature and allow the valve member to move to the open position, the inner pole face and the outer pole face being positioned opposite the inner end face and the outer end face, at least the outer pole face and the inner end face and the outer end face comprising a part of the magnetic flux loop which attracts the armature towards the inner and outer core when the coil is energized.

19. A dispenser as defined in claim 18, wherein the diaphragm spring has openings which align with openings in the inner armature and the outer armature.

20. A high frequency valve assembly having a magnetically operated valve for controlling the flow of a fluid, which comprises:

a body having a inner chamber and having a passageway to introduce the fluid into the chamber;

a inner core within the chamber having an inner passageway through which the fluid flows;

an outer core around the inner core;

a valve member positioned within the chamber and movable between an open position in which fluid flows out of the chamber and a closed position in which fluid flow from the chamber is blocked;

an armature within the chamber connected to move the valve member to the open position, the armature having a plurality of openings extending therethrough to permit at least some of the fluid on one side of the armature to move through the armature to the other side of the armature as the armature moves within the chamber;

a diaphragm spring mounted within the chamber and engaging the armature to bias the valve member to the closed position; and a magnetic coil between the inner core and the outer core within the chamber and capable of energization to move the armature and allow the valve member to move to the open position.

21. A valve assembly as defined in claim 20, wherein the spring has one or more openings which align with one or more of the openings of the armature.

22. A valve assembly as defined in claim 20, wherein the inner core and the outer core have end faces, and the armature is positioned adjacent to the end faces of the cores.

23. A valve assembly as defined in claim 22, wherein the armature presents a pole face which substantially covers the end faces of the cores.

24. A valve assembly as defined in claim 23, wherein the pole face covers the entire end faces of the cores except for the outer periphery thereof.

25. A valve assembly as defined in claim 23, wherein the armature pole face is comprised of pole faces of an inner armature and an outer armature, the pole faces being positioned opposite the end faces.

26. A valve assembly as defined in claim 20, wherein magnetic force produced by the coil and cores upon the armature is balanced with spring force produced by the diaphragm spring upon the armature to permit rapid actuation of the valve assembly.

27. The valve assembly as defined in claim 20, wherein the armature is comprised of an inner armature and an outer armature, and the spring is secured between them.

28. The valve assembly as defined in claim 27, wherein the spring has an inner diameter which encircles an outside diameter of the inner armature.

29. The valve assembly as defined in claim 28, wherein the plurality of openings are formed in the outer armature and the spring has a plurality of openings which align with the openings in the outer armature.

30. A valve assembly as defined in claim 20, wherein the armature includes grooves on a surface of the armature adjacent to the cores to channel material to the holes.

31. A valve assembly as defined in claim 20, wherein the armature has lands which extend from a surface of the armature adjacent to the cores to position the armature relative to the cores.

32. A valve assembly as defined in claim 31, wherein the armature has three lands.

33. A valve assembly as defined in claim 32, wherein the armature is comprised of an inner armature and an outer armature, and the three lands are formed on the outer armature, the three lands extending from a surface of the outer armature adjacent to contact the outer core to position the armature relative to the cores.

34. A valve assembly as defined in claim 20, wherein the armature includes an inner armature which moves within the chamber to move the valve member and an outer armature around the inner armature which has the holes, the inner armature having a central flow passage for the fluid which communicates with the inner passageway of the inner core.

35. A valve assembly as defined in claim 20, wherein the diaphragm spring has a spring rate in excess of 500 lb/in.

36. A valve assembly as defined in claim 20, wherein the coil is a wetted coil.

* * * * *

UNITED STATES PATENT AND TRADEMARK OFFICE
CERTIFICATE OF CORRECTION

PATENT NO. : 5,791,531
DATED : August 11, 1998
INVENTOR(S) : Hassler

It is certified that error appears in the above-identified patent and that said Letters Patent is hereby corrected as shown below:

On the title page, item [75]:
change the name of the inventor
from "William T. Hasser, Jr."
to --William L. Hassler, Jr.--.

Signed and Sealed this

Twenty-second Day of June, 1999

Attest:

Q. TODD DICKINSON

Attesting Officer

Acting Commissioner of Patents and Trademarks